(12) United States Patent
Klauer

(10) Patent No.: US 8,106,314 B2
(45) Date of Patent: *Jan. 31, 2012

(54) METHOD AND APPARATUS FOR DYNAMICALLY CHECK WEIGHING OBJECTS CONVEYED AT ADJUSTABLE RATES USING VARYING FILTER LENGTHS

(75) Inventor: Alfred Klauer, Goettingen (DE)

(73) Assignee: Sartorius Weighing Technology GmbH, Goettingen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,055

(22) Filed: Feb. 22, 2010

(65) Prior Publication Data

US 2010/0147597 A1 Jun. 17, 2010

Related U.S. Application Data

(63) Continuation of application No. PCT/EP2008/005112, filed on Jun. 25, 2008.

(30) Foreign Application Priority Data

Aug. 24, 2007 (DE) .......................... 10 2007 040 301

(51) Int. Cl.
*G01G 19/03* (2006.01)
*G01G 11/04* (2006.01)

(52) U.S. Cl. ..................... 177/25.13; 177/145; 177/185; 702/101

(58) Field of Classification Search ............... 177/25.13, 177/145, 185; 702/101
See application file for complete search history.

(56) References Cited

U.S. PATENT DOCUMENTS

| | | | | |
|---|---|---|---|---|
| 4,231,439 A | * | 11/1980 | Hall et al. | 177/25.14 |
| 4,817,026 A | * | 3/1989 | Inoue et al. | 708/300 |
| 5,130,938 A | * | 7/1992 | Inoue | 702/194 |
| 5,300,736 A | | 4/1994 | Ehrhardt | |
| 5,308,930 A | | 5/1994 | Tokutu et al. | |
| 6,012,031 A | | 1/2000 | Oliver et al. | |
| 6,794,586 B1 | * | 9/2004 | Mason | 177/25.15 |
| 7,405,368 B2 | * | 7/2008 | Beck et al. | 177/25.13 |
| 7,613,575 B2 | * | 11/2009 | Nussbaumer et al. | 702/41 |
| 7,739,068 B2 | | 6/2010 | Reber | |
| 2010/0147598 A1 | * | 6/2010 | Klauer | 177/25.13 |

FOREIGN PATENT DOCUMENTS

| | | |
|---|---|---|
| DE | 10322504 A1 | 12/2004 |
| EP | 0429725 A | 6/1991 |
| EP | 1363112 A | 11/2003 |
| EP | 1736748 A1 | 12/2006 |
| WO | 2004/102135 A | 11/2004 |

* cited by examiner

*Primary Examiner* — Randy W Gibson
(74) *Attorney, Agent, or Firm* — Sughrue Mion, PLLC

(57) ABSTRACT

A method and an apparatus for dynamically checking the weight of objects (18*a-c*) which are guided across a weight-sensitive zone (14) of a weighing device (12) at an adjustable conveying rate by a conveying mechanism (20*a-c*). At regular intervals, the weight-sensitive zone (14) supplies individual measured weight values ($E_1, \ldots, E_n$) from which resultant weight values are derived in a digital evaluation unit (16) by averaging. The evaluation unit (16) includes a plurality of cascaded averaging filters (24*a-e*) which have different filter lengths that are varied by a common scaling factor depending on the conveying rate.

14 Claims, 1 Drawing Sheet

METHOD AND APPARATUS FOR DYNAMICALLY CHECK WEIGHING OBJECTS CONVEYED AT ADJUSTABLE RATES USING VARYING FILTER LENGTHS

This application is a Continuation of International Patent Application PCT/EP2008/005112, filed Jun. 25, 2008, and claiming priority from German Patent Application 10 2007 040 301.3, filed Aug. 24, 2007. The complete disclosures of these patent applications are incorporated into the present application by reference.

FIELD AND BACKGROUND OF THE INVENTION

The invention relates to a method for dynamically checking weights of objects which are conveyed with a conveying mechanism at an adjustable conveying rate over a weight-sensitive zone of a weighing mechanism, wherein the weight-sensitive zone supplies individual measured weight values at regular intervals, from which resultant weight values are derived through averaging in a digital evaluation unit.

The invention also relates to an apparatus for dynamically checking weights of objects, comprising a weighing mechanism with a weight-sensitive zone, a conveying mechanism which conveys the objects at an adjustable conveying rate over the weight-sensitive zone of the weighing mechanism, wherein the weight-sensitive zone supplies individual measured weight values at regular intervals, from which a digital evaluation unit connected downstream derives a resultant weight value by averaging.

Methods and apparatus of this type are disclosed by DE 103 22 504 A1 and its published US counterpart US 2007/0181349 A1, which is incorporated into the present application by reference. This document discloses "control scales" and a method for the adjustment and operation thereof. Control scales are understood to be weighing mechanisms having a weight-sensitive zone to which objects are conveyed more or less continuously by a conveying mechanism in order to be weighed there. The weighed objects are then transported away by the conveying mechanism and possibly sorted according to the weighing result. A typical field of use of such control scales is the final checking of nominally identical objects. An example thereof is the final filling quantity checking of cans of preserved food.

A fundamental problem of such systems lies in finding a satisfactory compromise between weighing accuracy and weighing speed. Such systems are also typically operated in an industrial environment with severe interfering influences. A typical configuration involves, for example, the conveying of the objects by a fast-moving conveyor belt which passes the objects to a separate conveyor belt zone supported on the weight-sensitive zone of the weighing mechanism, and this conveyor belt zone subsequently passing the objects, following weighing, to a further conveyor belt section. In systems of this type, the weighing signal is overlaid with significant interfering influences firstly from the movement of the conveyor belt, secondly from the only partial contact of the object with the conveyor belt section supported on the weighing mechanism on entry and exit, and thirdly from other vibrations in the industrial environment. It has therefore proved useful, instead of a single measurement value, to record a plurality of individual measurement values for an object and, with the use of suitable averaging, to derive a resultant weight value. In the document cited, averaging is carried out over a particular section of the sequence of individual measurement values. Within the context of a pre-setting procedure wherein a plurality of objects are weighed while varying parameters for the section, the optimum position and length of the averaging section is found by "automatic" experimentation. This section selection is then maintained for the subsequent checking operation of the system.

OBJECTS AND SUMMARY OF THE INVENTION

A disadvantage of the known method is the lack of flexibility in relation to changes in belt speed. Variations of belt speed frequently occur in practice during industrial operation. They can arise from variations of both technical and personnel-related origin in the conveying rate during feeding of the objects. In order to maintain operation, the conveying rate over the weight-sensitive zone of the weighing mechanism must be exactly matched to the conveying rate for feeding. In the known apparatus, it is necessary to carry out a new pre-setting procedure for every change of conveying rate. This is associated with significant downtime and therefore also cost disadvantages.

It is an object of the present invention to provide a control scale of the aforementioned type and a method for check weighing of the aforementioned type in order to ensure better adaptation to varying conveying rates.

According to one formulation of the invention, this is achieved by a method for dynamically checking weights of objects, which includes: conveying the objects with a conveying mechanism at an adjustable conveying rate over a weight-sensitive zone of a weighing mechanism; from the weight-sensitive zone, supplying individual measured weight values at regular intervals, and deriving resultant weight values by averaging the measured weight values in a digital evaluation unit; and, in the evaluation unit, varying respective filter lengths of a plurality of cascaded averaging filters of different filter lengths by a common scaling value in accordance with the conveying rate.

According to another formulation, an apparatus for dynamically checking weights of objects includes a weighing mechanism with a weight-sensitive zone, a conveying mechanism which conveys the objects at an adjustable conveying rate over the weight-sensitive zone of the weighing mechanism, wherein the weight-sensitive zone is configured to supply individual measured weight values at regular intervals, a digital evaluation unit configured to derive resultant weight values by averaging, wherein the evaluation unit has a plurality of cascaded averaging filters of different filter lengths and a filter length adjuster configured to vary the filter lengths by a common scaling value depending on the conveying rate.

Particularly advantageous embodiments of the invention are the subject matter of the dependent claims.

The features, effects and advantages of the inventive method and the inventive apparatus will now be discussed together.

The invention makes use of inherent properties of "averaging filter cascades." An averaging filter cascade is understood to be a series of averaging filters each of which converts a number of sequential input values, determined by the "filter length," into an average value and outputs this value as an input value for the next filter. Essentially two variants thereof are favorable. In a first variant, the sequence of individual measurement values is subdivided into subsections of the filter length and, for each section, an average value is calculated and output. The number of values input into the subsequent filter is decremented relative to the number of values input to the previous filter by a factor depending on the filter length. In the second variant, the average values are each calculated in a moving window over the filter length. This means that the number of calculated average values approximately corresponds to the number of individual values input into the filter. With suitable choice of the filter lengths in the cascade, dominant interference frequencies can be very reliably filtered out. The particular choice of filter lengths is a complex, case-specific undertaking, but is known to and within the ordinary skill of a person skilled in the art.

The inventors have recognized, as an inherent property of a filter cascade of this type, that the underlying form of the impulse response, i.e., the transfer function of the filter cascade, is essentially dependent only on the relationships of the filter lengths of the individual filters to one another. Variation of the filter lengths without changing their relationships to one another can change the position and width of the transfer function on the frequency axis, but not the fundamental form thereof. This special property is made use of in the present invention.

The invention utilizes the fact that, with a change in the conveying rate, the main interference frequencies caused by the conveying motion change accordingly. If, for example, the conveying rate is increased, the interference frequencies are displaced toward higher frequencies. The converse is the case for a reduction in the conveying rate. The invention proposes, instead of completely resetting the filter cascade when the conveying rate is changed, the filter lengths of the cascade should be adapted without changing their relationships to one another. In other words, the filter lengths of the cascade are scaled using a common scaling value. In particular, an inversely proportional dependence of the scaling value on the conveying rate has proved to be a suitable form of dependence.

A noteworthy advantage of the method is the rapid and flexible adjustment to conveying rate variations, even if these variations occur only for a short time.

This flexible adjustability enables automation of the speed adjustment. To this end, the conveying rate is measured at regular intervals by a speed sensor and a measured speed value is transferred to the evaluation unit for corresponding setting of the scaling value. Speed sensors, which can be included in the control scales for this purpose, are also known to a person skilled in the art, as are the requisite techniques for setting-up the evaluation unit, which can be carried out through the automated programming of digital filters in a data processing system.

An important step in preparing the sequence of the inventive method is the initial choice of the filter lengths for a given normal conveying rate. This is usually carried out empirically, since the interference frequencies which need, in each case, to be filtered out are strongly dependent on the individual environment, the normal conveying rate, the object sizes and weights, etc. In order to simplify this empirical setting-up process, it is proposed that in order to make a choice of initial setting of the filter lengths, the individual measured weight values for a representative object are stored in a circular buffer and averaging is carried out on the stored values repeatedly by the evaluating unit and with iteratively varying filter lengths until the resultant weight value agrees with the actual weight value of the object. In other words, this means that the weighing of a plurality of objects with different filter settings is carried out virtually, in that the new uptake of individual weight values of many objects is simulated by the frequent repetition of the individual measured weight values for a single object that are stored in the circular buffer. This simulation with varying filter settings is repeated until the resultant weight value agrees with the (known) actual weight of the object. The concept of "agreement" is naturally understood here to be "agreement within given tolerance rules," wherein the tolerance rules must be adapted to the respective requirements of the individual case.

In many cases, starting from a previously tried, or standard, pre-set filter length configuration, it may be sufficient during iterative variation of the filter lengths as part of the adjustment process, to keep the relationship of these filter lengths to one another constant. In other words, this means that in such cases, the adjustment procedure is limited to finding the initial scaling value, in particular, one, from which the conveying rate-dependent variations during operation are derived.

In a development of the inventive method, it is provided that the same underlying principle is also applied to the adjustment of the filter configuration to different object sizes and particularly to their length in the conveying direction. This is achieved in that the filter lengths are varied by a common scaling value depending on the longitudinal length of the objects in the conveying direction. For the purpose of automation, it is favorable if the longitudinal length of an object in the conveying direction is detected by a length sensor and is transmitted to the evaluation unit for corresponding setting of the scaling value. This enables the use of control scales not only for pure monitoring tasks in relation to nominally similar objects, but also for weight-dependent sorting of objects of different sizes.

BRIEF DESCRIPTION OF THE DRAWINGS

Other features and advantages of the invention will now be disclosed in the detailed description, making reference to the drawings, in which.

DETAILED DESCRIPTION OF EXEMPLARY EMBODIMENTS

Figure 1:
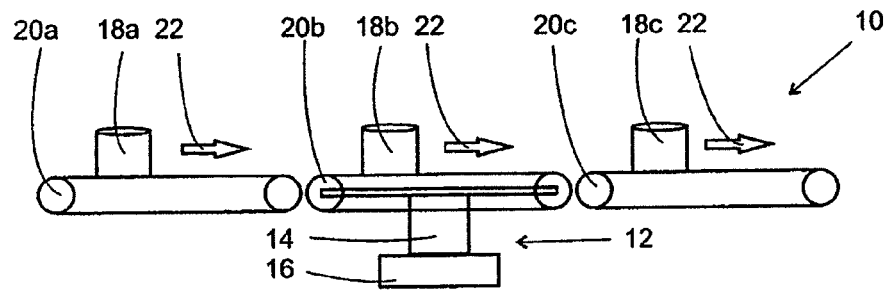
FIG. 1 is a schematic representation of a control scale.

FIG. 1 shows a schematic representation of a control scale 10. The control scale 10 includes a weighing mechanism 12 with a weight-sensitive zone 14 and an attached evaluation unit 16. The evaluation unit 16 can be configured, in particular, on the basis of a microprocessor. Control scales of this type typically have a display and operating unit, although this unit is not shown in FIG. 1 for the sake of simplicity.

Objects 18$a$-$c$, for which check weighings are to be carried out, are conveyed to and away from the weighing mechanism 12 via a conveyor belt 20, which has a plurality of sections 20$a$-20$c$. The central conveyor belt section 20$b$ in FIG. 1 is supported on the weight-sensitive zone 14 of the weighing mechanism 16. It follows therefrom that an object (18$b$ in FIG. 1) situated on the conveyor belt section 20$b$ can be weighed by the weighing mechanism 12. As indicated by the movement arrows 22, the object 18$b$ moves with the conveyor belt in the conveying direction at the conveyance speed during the weighing. During the period in which the object 18$b$ is situated on the conveyor belt section 20$b$, the weight-sensitive zone 14 of the weighing mechanism 12, which can, in particular, comprise an A/D converter, supplies a sequence of n individual measured weight values $E_1, E_2, \ldots E_n$ at regular intervals, i.e., specifically at the converter-frequency. This sequence of individual measured weight values represents a temporally varying measurement signal in which the measurement value for the weight of the object 18*b* is overlaid with signals which are attributable to the aforementioned interference variables.

Figure 2:
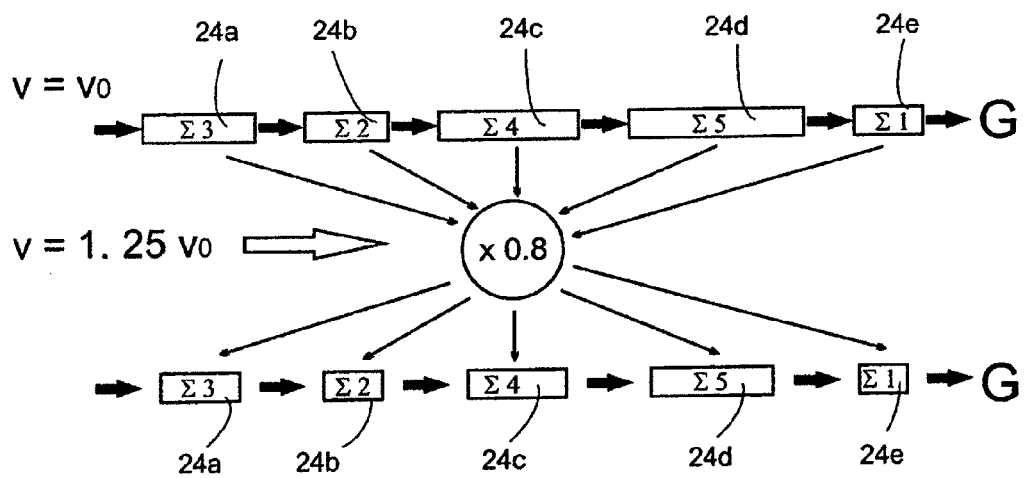
FIG. 2 is a schematic representation of the inventive scaling principle.

In order to rid the signal of the interference signals, as shown schematically in the upper part of FIG. 2, the signal is passed through a cascade of averaging filters. In the embodiment shown, the filter cascade comprises a sequence of five averaging devices of different filter lengths connected one after another. Each averaging device comprises a shift register which is able to store a number of results values corresponding to the filter length. As soon as the register is full, an average value is generated from the stored individual values and is output as a first output value. Each new input value in the shift register pushes out the respective oldest stored value and initiates the calculation of a new average value from the individual values currently stored in the register and then outputs this value as the next output value. The resulting sequence of output average values from the first averaging device is read into the second averaging device which operates on the same principle, but can have a different filter length. In this way, the values run through the entire filter cascade so that at the end thereof, a filtered sequence of resultant weight values, identified as G in FIG. 2, is produced. Alternatively, it is also possible to configure the filter cascade such that only a single resultant weight value is produced. This can be achieved, for example, (i) in that a sequence of values leaving the last filter is grouped together, for example, averaged, (ii) in that a single value is selected from the output sequence of the last filter or (iii) in that the filter cascade does not operate according to the principle of the "rolling window" described above, but instead operates batch-wise, thus reducing the number of values to be passed on in each filter stage.

The individual filter stages, which are identified in FIG. 2 with the reference signs 24*a-e* are shown schematically as blocks of different lengths, symbolizing their respectively different filter lengths. It has been assumed, in the embodiment of FIG. 2, that the filter lengths of the individual filter stages 24*a-e* stand in a ratio to one another of 3:2:4:5:1, which is indicated in FIG. 2 by way of the symbols E3, E2, E4, E5, E1. Expressed in absolute values, for example, filter length gradations of 12:8:16:20:4 values to be averaged represent a favorable choice in practice. Typically, one would aim for the most even possible distribution of zeros in the frequency response.

The actual further use of the resultant weight value(s) G is adapted as needed to each individual case. For example, a target weight of the object 18*b* can be taken as achieved if a pre-set weight threshold value is overshot and undershot by a sequence of resultant weight values G a particular number of times. In cases where an individual resultant weight value G is calculated, the weight value can be compared with one or more pre-set weight threshold values, for controlling a subsequent sorting system (not shown in the figures). The particular use to which the resultant weight value(s) G are put is not part of the subject matter of the present invention.

The lower part of FIG. 2 shows schematically a mechanism that adapts to changes in the conveying rate. In the example shown, it is assumed that the conveying rate v accelerates from a starting velocity v0 by a factor 1.25 to v=1.25×v0. This speed change is preferably detected by speed sensors (not shown in the figures) and transmitted to the evaluating unit 16. The evaluating unit 16 then changes the filter lengths of the filter stages 24*a-e*. The change takes place for all the filter stages 24*a-e* to the same extent, i.e., with the same, preferably linear, dependency, although non-linear dependencies can also be realized. In the example shown in FIG. 2, a particularly advantageous dependency of the scaling value on the acceleration factor of the conveying rate, specifically an inversely proportional dependency, is realized. The result, as shown in the lower part of FIG. 2, is that the lengths of the individual filter stages 24*a-e* are each shortened absolutely, even though their relative relation to one another is maintained. This means that the filter lengths are in the ratio of 3:2:4:5:1 to one another, as before. Given identical objects 18*a-c*, this leads essentially to the same weighing result, as symbolized by the resultant weight value G. This is the consequence of the fact that a linear scaling of the filter lengths of a cascade does not essentially change the underlying form of the transfer function of the filter cascade, and instead influences only the positioning and the length and width thereof.

Figure 3:
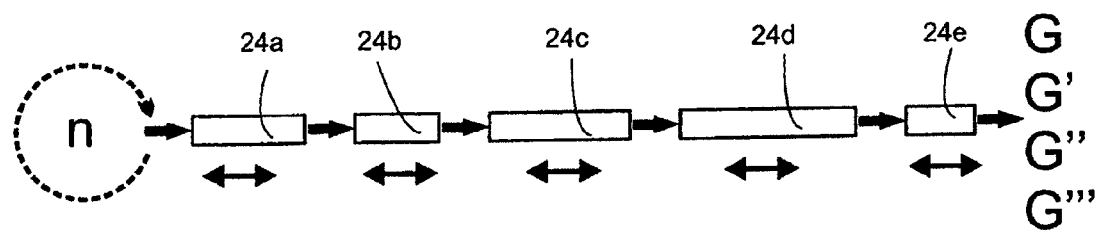
FIG. 3 is a schematic representation of a preferred filter adjustment procedure.

FIG. 3 shows schematically a preferred method for adjusting a starting configuration of filter lengths in the cascade. For this purpose, the individual measured weight values E1, E2, . . . , En of an object 18*b* are initially generated in the above described manner and stored in a circular buffer with n storage places. The stored sequence of values is then fed anew into the filter cascade, wherein for each repetition step, the lengths of the individual filter stages 24*a-e* are varied, which leads to different resultant weight values or sequences of values G, G', G", G"', . . . . In other words, the actual weighing of a plurality of objects 18*a*, 18*b*, 18*c*, . . . is replaced by the repeated filtration of the sequence of values measured once for the object 18*b*. As soon as the resultant weight value(s) of the (known) object 18*b* have the expected and desired values, the adjustment process can be concluded and the filter configuration found can be adopted for the subsequent (e.g., accelerated or decelerated) operation of the control scale in the manner described above.

The embodiments discussed in the description and illustrated in the drawings represent only exemplary embodiments of the present invention for illustration purposes. A broad spectrum of possible variants is available to a person skilled in the art in light of the present disclosure. In particular, the number and configuration of the filter stages of the cascade can be adjusted on a case by case basis. It is also possible to use cascades with different sections, of which only one or a few sections follow the above explained variation principle and one or more other sections remain constant regardless of the conveying rate or the object size. The latter is particularly meaningful if it is known that interfering influences that are independent of weight and size overlay the measurements.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A method for dynamically checking weights of objects, comprising:
   conveying the objects with a conveying mechanism at an adjustable conveying rate over a weight-sensitive zone of a weighing mechanism;
   from the weight-sensitive zone, supplying individual measured weight values at regular intervals, and deriving resultant weight values by averaging the measured weight values in a digital evaluation unit; and
   in the evaluation unit, varying respective filter lengths of a plurality of cascaded averaging filters by varying only a common scaling value of the plurality of filters in accordance with the conveying rate.

2. The method as claimed in claim 1, wherein the scaling value varies in inverse proportion to the conveying rate.

3. The method as claimed in claim 1, further comprising: measuring the conveying rate at regular intervals with a speed sensor; transmitting respective measured conveying rate values to the evaluation unit; and setting the scaling value in accordance with the respective measured conveying rate values.

4. The method as claimed in claim 1, further comprising: selecting an initial setting of the filter lengths by storing the individual measured weight values of a representative one of the objects in a circular buffer; and repeating the average value calculations in the evaluation unit on the stored values with respective filter lengths iteratively varied by iterative values of the scaling value until the resultant weight values match an actual weight of the representative object.

5. The method as claimed in claim 4, wherein, during the iterative variation of the filter lengths, a relationship of the filter lengths to one another remains constant.

6. The method as claimed in claim 1, further comprising: varying the filter lengths by varying the common scaling value additionally in accordance with a length of the objects in the conveying direction.

7. The method as claimed in claim 6, further comprising: detecting the length of the objects in the conveying direction with a length sensor; and, in the evaluation unit, setting the scaling value additionally in accordance with the detected length.

8. An apparatus for dynamically checking weights of objects, comprising
 a weighing mechanism with a weight-sensitive zone,
 a conveying mechanism which conveys the objects at an adjustable conveying rate over the weight-sensitive zone of the weighing mechanism,
 wherein the weight-sensitive zone is configured to supply individual measured weight values at regular intervals, and
 a digital evaluation unit configured to derive resultant weight values by averaging, wherein the evaluation unit comprises a plurality of cascaded averaging filters of different filter lengths, and a filter length adjuster configured to vary only a common scaling value of the filter lengths in accordance with the conveying rate.

9. The apparatus as claimed in claim 8, wherein the scaling value varies in inverse proportion to the conveying rate.

10. The apparatus as claimed in claim 8, further comprising a speed sensor configured to measure and output a conveying rate value to the evaluation unit, wherein the evaluation unit is configured to vary the scaling value in accordance with the output conveying rate value.

11. The apparatus as claimed in claim 8, wherein the evaluation unit further comprises a circular buffer in which the individual measured weight values of a representative one of the objects are stored and the evaluation unit is configured to repeat averaging of the buffered values with respective filter lengths iteratively varied by iterative values of the scaling value until the resultant weight values correspond with an actual weight value of the representative object.

12. The apparatus as claimed in claim 11, wherein, during the iterative variation of the filter lengths, a relationship of the filter lengths to one another remains constant.

13. The apparatus as claimed in claim 8, wherein the filter length adjuster is configured to vary the filter lengths by varying the common scaling value additionally in accordance with a length of the objects in the conveying direction.

14. The apparatus as claimed in claim 13, further comprising a length sensor configured to output a length value of an object to the evaluation unit, wherein the evaluation unit is configured to change the scaling value in accordance with the output length value.

\* \* \* \* \*